US012665629B2

(12) United States Patent
Polydoros et al.

(10) Patent No.: US 12,665,629 B2
(45) Date of Patent: Jun. 23, 2026

(54) CHANNEL PROFILING FOR FREQUENCY-HOPPING DIRECT-SEQUENCE SPREAD SPECTRUM SYSTEMS

(71) Applicant: TrellisWare Technologies, Inc., San Diego, CA (US)

(72) Inventors: Andreas Polydoros, San Diego, CA (US); Cenk Köse, San Diego, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 138 days.

(21) Appl. No.: 18/813,417

(22) Filed: Aug. 23, 2024

(65) Prior Publication Data

US 2025/0070819 A1 Feb. 27, 2025

Related U.S. Application Data

(60) Provisional application No. 63/534,143, filed on Aug. 23, 2023.

(51) Int. Cl.
| | |
|---|---|
| *H04B 1/692* | (2011.01) |
| *H04B 1/707* | (2011.01) |
| *H04B 1/713* | (2011.01) |

(52) U.S. Cl.
CPC ............. *H04B 1/692* (2013.01); *H04B 1/707* (2013.01); *H04B 1/713* (2013.01)

(58) Field of Classification Search
CPC ........ H04B 1/692; H04B 1/707; H04B 1/713; H04B 2201/70701; H04B 1/7073; H04B 1/7113; H04B 1/7156
See application file for complete search history.

(56) References Cited

U.S. PATENT DOCUMENTS

| | | | |
|---|---|---|---|
| 2019/0268036 A1* | 8/2019 | Macleod | ................. G01S 19/30 |
| 2020/0313719 A1* | 10/2020 | Blanchard | ............ H04B 17/336 |

OTHER PUBLICATIONS

Veselinovic et al. "Wideband interference suppression in turbo-coded DS/FH system," ICC 2001. IEEE International Conference on Communications. Conference Record (Cat. No. 01CH37240), Helsinki, Finland, 2001, pp. 2789-2793 vol. 9 (Year: 2001).*

* cited by examiner

*Primary Examiner* — Sam K Ahn
*Assistant Examiner* — Amneet Singh
(74) *Attorney, Agent, or Firm* — Perkins Coie LLP

(57) ABSTRACT

Methods and systems for low-complexity channel profiling in frequency-hopped (FH) direct-sequence spread spectrum (DSSS) wireless communication systems are described. An example system includes a receiver configured to receive, over a channel, a FH DSSS signal associated with multiple frequency hops, and a processor configured to perform, using a first subset of the multiple frequency hops, a timing acquisition operation using a full correlative processing operation. The receiver is then configured to perform, subsequent to the timing acquisition operation and using a second subset of the multiple frequency hops, a predominant delay estimation operation, where estimating predominant channel delays excludes using the full correlative processing operation, and finally compute, based on an output of the predominant delay estimation operation, a channel estimate comprising an estimate of each of a number of channel taps that represent the channel, and where each channel tap estimate comprises a gain, a phase, and a delay.

20 Claims, 10 Drawing Sheets

Single-hop, noiseless view

| Symbol | Description | Representative value |
|---|---|---|
| Time 0 | Time of probe transmission | |
| $T_{pilot}$ | Pilot duration | 100 usec = 600 chips at 6 Mcps |
| $s_i(t), 0 \leq t$ | Transmitted signal on $i$th ACQ hop | |
| $z_i(t), 0 \leq t$ | Receiver's record on $i$th ACQ hop | |
| $c_i(t), 0 \leq t < T_{pilot}$ | Reference pilot chips on $i$th ACQ hop | $c_i(t) = s_i(t), 0 \leq t < T_{pilot}$ |

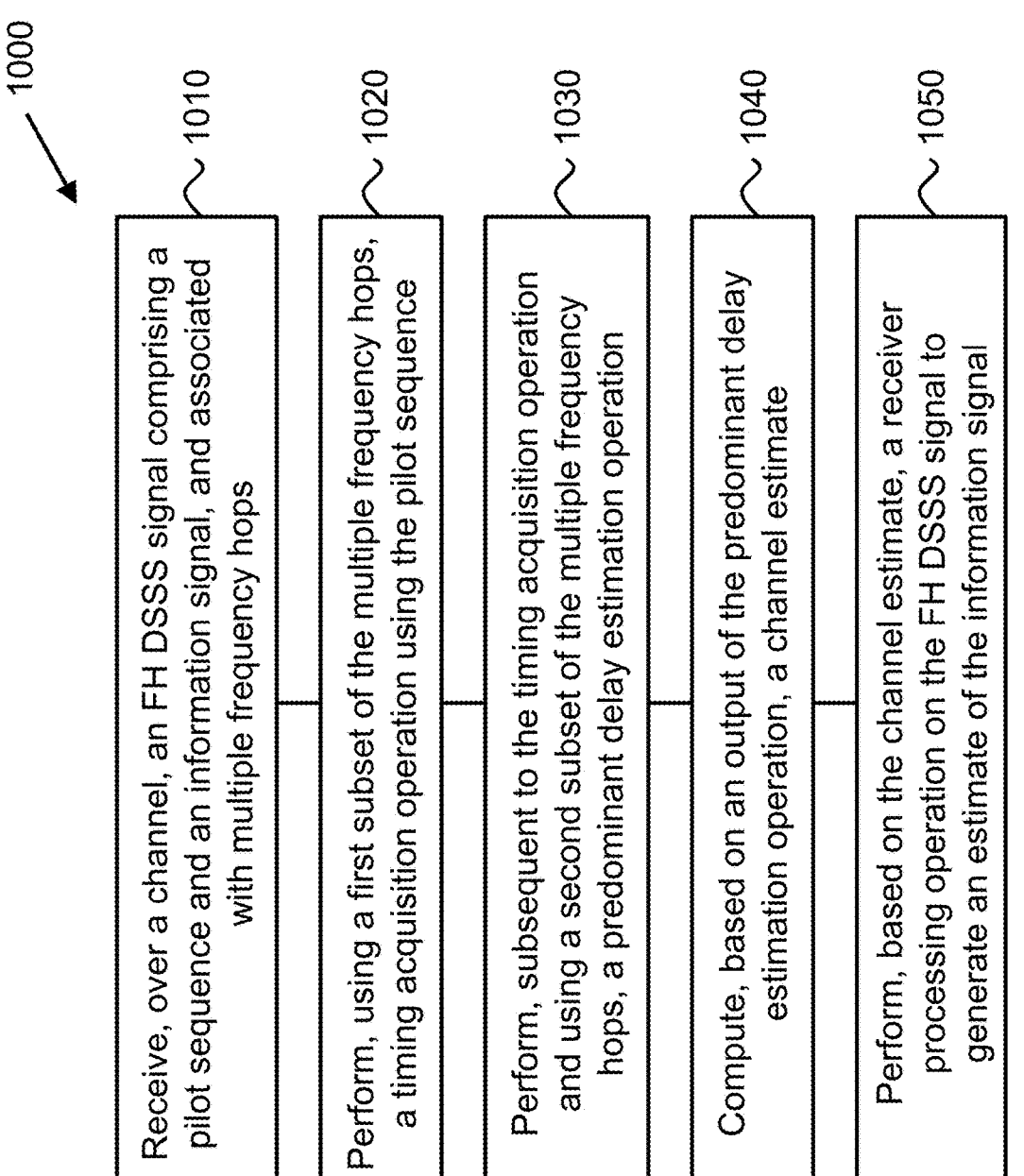

1000

1010 — Receive, over a channel, an FH DSSS signal comprising a pilot sequence and an information signal, and associated with multiple frequency hops 1020 — Perform, using a first subset of the multiple frequency hops, a timing acquisition operation using the pilot sequence 1030 — Perform, subsequent to the timing acquisition operation and using a second subset of the multiple frequency hops, a predominant delay estimation operation 1040 — Compute, based on an output of the predominant delay estimation operation, a channel estimate 1050 — Perform, based on the channel estimate, a receiver processing operation on the FH DSSS signal to generate an estimate of the information signal

FIG. 10

CHANNEL PROFILING FOR FREQUENCY-HOPPING DIRECT-SEQUENCE SPREAD SPECTRUM SYSTEMS

CROSS-REFERENCE TO RELATED APPLICATION

This application claim priority to U.S. Provisional Application No. 63/534,143, filed on Aug. 23, 2023, the disclosure of which is hereby incorporated by reference herein in its entirety.

TECHNICAL FIELD

This document generally relates to wireless networks, and more specifically, to channel estimation in frequency-hopping wireless communication systems.

BACKGROUND

Frequency hopping is the periodic changing of the carrier frequency of a transmitted signal, and the sequence of carrier frequencies is called the frequency-hopping pattern. Although it provides minimal advantage against white noise, frequency hopping enables signals to hop out of frequency channels with interference or slow frequency-selective fading. This capability is fully exploited against narrowband interferers by using disjoint frequency channels.

SUMMARY

Methods and systems for low-complexity channel profiling in frequency-hopping (or frequency-hopped) (FH) direct-sequence spread spectrum (DSSS) wireless communication systems are described. In the disclosed embodiments, the timing of a FH DSSS physical layer (PHY) burst (that typically includes many 100s of hops) is acquired using only the first 4 (four) to 10 (ten) frequency hops (termed "acquisition hops") and full correlative processing at half the chip rate. Using the full correlative search to determine the predominant finger locations of subsequent hops based on the acquired timing is computationally prohibitive. Embodiments of the disclosed technology use machine learning (ML) techniques to extract the predominant delay information that is embedded in the frequency-domain features of the received hop sample sequences. When the channel profile is sparse (the number of channel taps with significant energy, i.e., the number of predominant taps, is much smaller than the chip-spaced delay spread), the described techniques use nearly two orders of magnitude fewer operations than those required for implementations that employ the full correlative search instead of the predominant delay estimation (PDE) operation. In some embodiments, the ML techniques are trained using short Discrete Fourier Transform (DFT) output snippets with labels indicating the predominant delays normalized by a maximum hypothesized delay spread.

In some example aspects, a method of wireless communication is described. The method includes receiving, over a channel, a plurality of chip-spaced samples corresponding to a frequency-hopping (FH) direct-sequence spread spectrum (DSSS) signal that includes a pilot sequence and an information signal, and the plurality of chip-spaced samples being associated with a plurality of frequency hops. The method further includes performing, using a first subset of frequency hops of the plurality of frequency hops, a timing acquisition operation using the pilot sequence, and performing, subsequent to the timing acquisition operation and using a second subset of frequency hops of the plurality of frequency hops, a predominant delay estimation (PDE) operation. In this example, the PDE operation includes computing an output of a discrete Fourier transform of a subset of the plurality of chip-spaced samples, the second subset of frequency hops being non-overlapping with the first subset of frequency hops, and the subset of the plurality of chip-spaced samples being associated with the second subset of frequency hops. The method further includes computing, based on the predominant delay estimation operation and the pilot sequence, a channel estimate, and performing, based on the channel estimate, a receiver processing operation on the FH DSSS signal to generate an estimate of the information signal.

In other example aspects, a system for wireless communication is described. The system includes one or more processors and a memory including instructions stored thereupon, wherein the instructions upon execution by the one or more processors cause the one or more processors to receive, over a channel, a frequency-hopping (FH) direct-sequence spread spectrum (DSSS) signal comprising a pilot sequence and an information signal, and the FH DSSS signal being associated with a plurality of frequency hops. The instructions further cause the one or more processors to perform, using a first subset of frequency hops, a timing acquisition operation using the pilot sequence, and perform, subsequent to the timing acquisition operation and using a second subset of frequency hops non-overlapping with the first subset of frequency hops, a predominant delay estimation operation. The one or more processors are then caused to compute, based on an output of the predominant delay estimation operation, a channel estimate using a multilayer perceptron, and perform, based on the channel estimate, a receiver processing operation on the FH DSSS signal to generate an estimate of the information signal.

In yet other example aspects, a system for wireless communication is described. The system includes a transceiver configured to receive, over a channel, a frequency-hopping (FH) direct-sequence spread spectrum (DSSS) signal comprising a pilot sequence and an information signal, wherein the FH DSSS signal is associated with a plurality of frequency hops, and one or more processors that are communicatively coupled to the transceiver. The one or more processors are configured to perform, using the pilot sequence and a first subset of the plurality of frequency hops, a timing acquisition operation using a full correlative processing operation, and perform, subsequent to the timing acquisition operation and using a second subset of the plurality of frequency hops, a predominant delay estimation operation, wherein estimating predominant channel delays excludes using the full correlative processing operation. The one or more processors are further configured to compute, based on an output of the predominant delay estimation operation, a channel estimate comprising an estimate of each of a number of channel taps that represent the channel, and perform, based on the channel estimate, a receiver processing operation on the FH DSSS signal to generate an estimate of the information signal. In this example system, the estimate of each channel tap comprises a gain, a phase, and a delay.

In yet other example aspects, a wireless communication apparatus that implements the above-described method is disclosed.

In yet other example aspects, the method may embodied as processor-executable code and may be stored on a non-transitory computer-readable program medium.

These, and other, features and aspects are described in this patent document.

BRIEF DESCRIPTION OF THE DRAWINGS

FIG. 10 is a flowchart of an example method of wireless communication.

DETAILED DESCRIPTION

Figure 1:
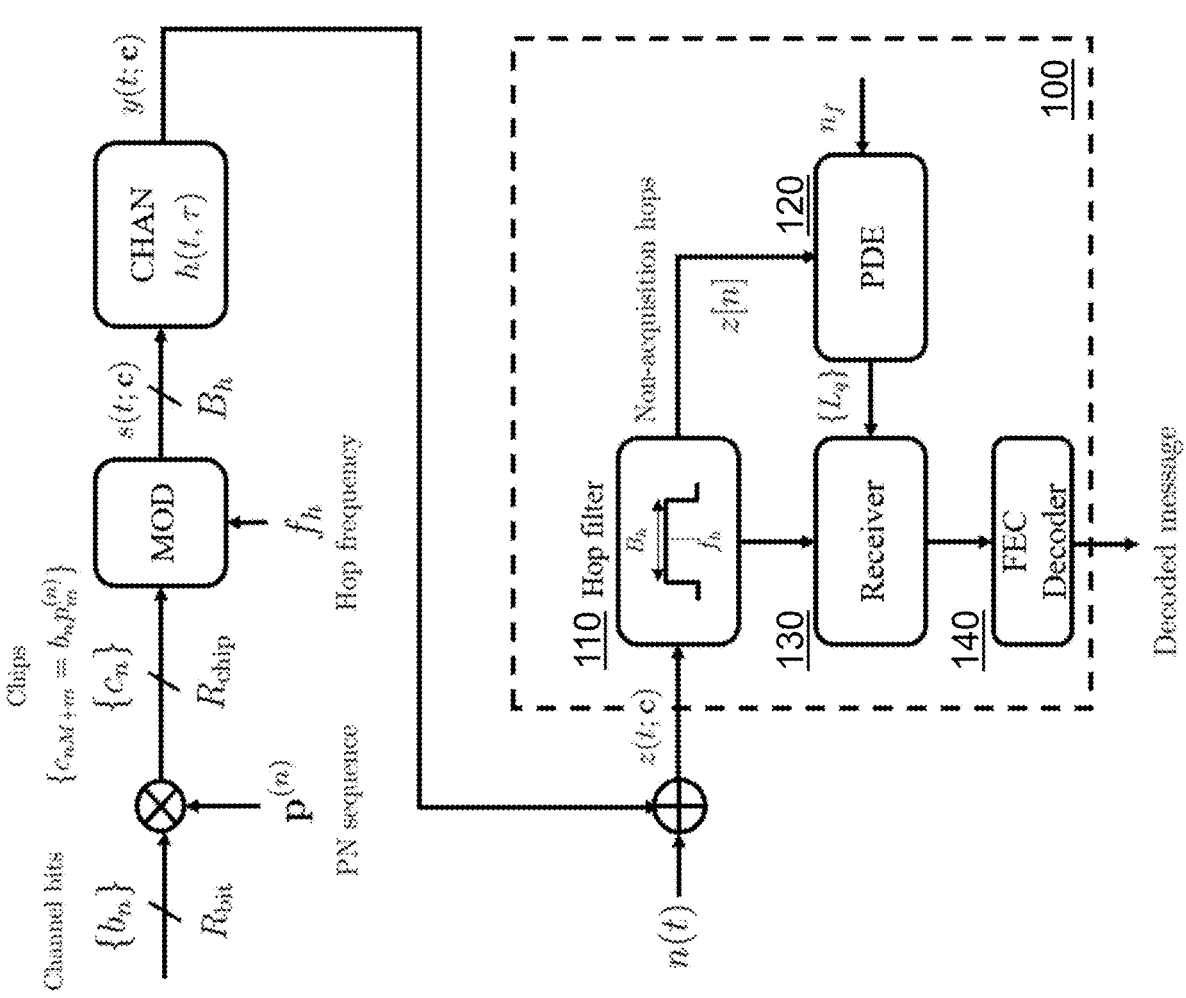
FIG. 1 is a block diagram of an example frequency-hopping (FH) direct-sequence spread spectrum (DSSS) wireless communication system with a receiver that enables low-complexity channel profiling.

Methods and systems for low-complexity channel profiling in frequency-hopping (FH) direct-sequence spread spectrum (DSSS) wireless communication systems are described. In FH DSSS systems, an encoded narrowband digital data sequence is first spread using a pseudo-noise (PN) sequence to produce a wideband sequence of chips, and contiguous segments of the chip sequence are transmitted in different frequency channels of a given bandwidth allocation via a pseudorandom change of the carrier frequency. In typical implementations, a digital codeword spans multiple frequency hops, i.e., multiple channels, to offer frequency diversity against degradations due to RF propagation (e.g., fading multipath), as well as RF interference. The hopping bandwidth of a FH DSSS system is typically much larger than its instantaneous bandwidth (referred to as the chip-bandwidth), by a factor of ten (10) to a thousand (1000).

Data detection (i.e., generation of data symbol estimates) in DSSS systems typically requires the estimation of one or more predominant multipath propagation delays in the chip-spaced signal domain. While it is possible to generate data symbol estimates using only a single predominant chip delay, typical DSSS receivers combine received chip values at a plurality of such delays to harvest multipath diversity/energy (referred to as a RAKE receiver). The acquisition of predominant delays is typically performed using a correlative search, where delayed replicas of the received signal is correlated against the PN spreading sequence and may incur substantial complexity.

In frequency-non-hopping DSSS systems, where the signal is transmitted over a single frequency channel, the predominant chip delays typically vary slowly compared to the duration of a signal burst, therefore a correlative acquisition of such delays is required only at intervals dictated by the maximal mobility. In contrast, an FH DSSS system needs to acquire the predominant delays for each frequency hop, since the channel impulse response (CIR) may vary significantly across the frequency channels in a multipath signal propagation environment. Given a hopping bandwidth B, and the associated overall wideband CIR (defined with respect to the band center), given as:

$$h(\tau) = \sum_m h_m \delta\left(\tau - \frac{m}{B}\right).$$

Herein, the chip-spaced baseband CIR for the frequency hop centered around frequency $f_k$ can be approximated as:

$$h_k[\ell] \approx \sum_m h_m e^{-j\ell \frac{mB_h}{B}} \operatorname{sinc}\left(\ell - \frac{mB_h}{B}\right).$$

In the above equation, $B_h$ is the instantaneous bandwidth (i.e., the hop bandwidth) of the signal. Without the measurement of the wideband CIR $h(\tau)$, which requires probe signaling at the full bandwidth, it is generally not possible to infer the predominant delays in $h_k[\ell]$ across frequency hops.

Embodiments of the disclosed technology advantageously use a full correlative search only for the first few hops of the signal to perform a time and frequency acquisition operation for FH DSSS systems. The results of the acquisition operation are used, in lieu of the full correlative search, to perform a channel estimation operation to determine the predominant channel delays for subsequent frequency hops that comprise data symbols. For a sparse channel profile, the described embodiments use nearly two orders of magnitude fewer operations compared to using the full correlative search (instead of the PDE operation).

The following list of symbols (with their descriptions and representative values) are used in the described methods, techniques, and embodiments.

| Symbol | Description | Representative value |
|---|---|---|
| $\{b_n\}$ | Channel bit sequence | Binary pseudorandom |
| $R_{bit}, T_{bit}$ | Channel bit rate, channel bit duration | 100 kbps, 10 usec |
| $p^{(n)}$ | PN code for the nth channel bit, of length M | Binary pseudorandom |
| M | Spreading factor | 60 (max) |
| $c = \{c_n\}$ | Chip sequence | Binary pseudorandom |
| $R_{chip}, T_{chip}$ | Chip rate, chip duration | 6 Mcps = M × $R_{bit}$ = 60 × 100 kbps, 166.6 nsec |

-continued

| Symbol | Description | Representative value |
|---|---|---|
| MOD | Modulator | GMSK |
| s(t; c) | Modulator output | N/A |
| $B_h$ | Instantaneous (hop) bandwidth | 6 MHz (99 pct) |
| B | Total (hopping) bandwidth | 40 MHz (nominal) |
| h(t; τ) | Wideband RF channel impulse response | Up to $\tau_{max=}$ 10 usec delay spread max 1 kHz Doppler shift per path (due to freq offset at L band) max 10 Hz Doppler spread per NLOS path (due to mobility at L band) |
| y(t; c) | Channel output | N/A |
| n(t) | Thermal + ambient noise, including receiver front-end noise-figure | −102 dBm thermal floor (5 dB NF) + any WB (white) interference + narrowband interference |
| $N_{c,\,pilot}$ | Number of pilot chips per hop | 600 chips (10 bits) |

FIG. 1 is a block diagram of an example FH DSSS wireless communication system with a receiver that enables low-complexity channel profiling. As shown therein, the hop filter 110 in the receiver 100 is configured to identify a first subset of hops ("acquisition (ACQ) hops") that are used to perform the timing acquisition operation (which is further detailed in context of FIGS. 2, 3A, 3B, 4A and 4B), and to identify a second subset of hops ("non-acquisition hops") that are used to perform the channel estimation operation using a predominant delay estimator 120 (which is further detailed in the context of FIGS. 5-8, 9A and 9B). Once the channel estimate has been derived, one or more receiver processing operations are performed using the receiver 130 and the forward error correction (FEC) decoder 140.

In the described embodiments, the first subset of hops typically includes 4-10 hops, which are used to acquire the signal, and the acquired timing will remain valid (to a good approximation) for subsequent hops. Furthermore, the PDE 120 overcomes the drawback of existing systems (e.g., RAKE receivers), which are unable to continually (and reliably) track the predominant fingers on any given acquisition hop because that particular finger may not necessarily be strong for subsequent hops (ACQ or non-ACQ hops).

Figure 2:
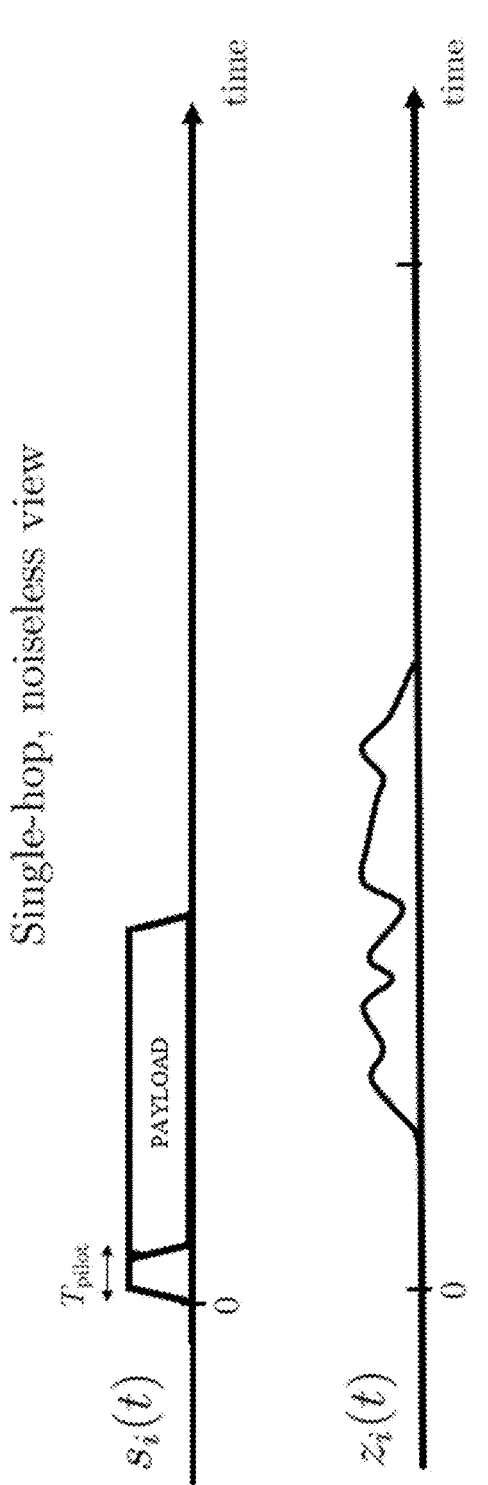
FIG. 2 shows an example time-series of the transmitted signal and the received signal on the i-th acquisition hop, and enumerates the relevant parameters.

FIG. 2 shows an example time-series of the transmitted signal $s_i(t)$ and the received signal $z_i(t)$ on a noiseless single hop (e.g., the i-th acquisition hop), and enumerates the relevant parameters and variables. As shown therein, the transmitted signal $s_i(t)$, which starts at time t=0, includes a pilot portion (with duration $T_{pilot}$) followed by a payload portion. The chips in the pilot portion are the reference pilot chips $c_i(t)$, and the receiver knows an acquisition hop contains $N_c$=600 chips in a burst. As noted earlier, there are 4-10 randomly located hops for acquisition. The timing acquisition operation uses $T_{chip}/2$-spaced processing, and determines each of the following:

probe time of arrival (ToA) for any single acquisition hop
  fine timing for any single acquisition hop
  final timing across multiple acquisition hops In some embodiments, the set of acquisition hops is configured to completely determine the output of the timing acquisition operation, e.g., the probe time of arrival, the fine timing, and/or the final timing estimate. In some examples, the acquisition hops are sufficient for acquiring the signal timing at a predetermined performance metric, e.g., probability of detection ($P_D$) within the acquisition window, bit error rate (BER), block error rate (BLER), and the like. For example, the timing acquisition operation only needs to use the acquisition hops to achieve a certain BER or $P_D$ at a specific chip-SNR (e.g., N acquisition hops were configured for the system parameters).

Furthermore, when determining each of the above, the timing acquisition operation computes the following metrics:

[Correlation]      $\gamma_i(t) = \int z(v - t)c_i^*(v)dv$

[Est. tap energy]   $\lambda_i^2(t) = |\gamma_i(t)|^2 / \int |c_i(v)|^2 dv$

[Corr. Score]     $\rho_i^2(t) = |\gamma_i(t)|^2 / \left( \int |c_i(v)|^2 dv \int |z(v-t)|^2 dv \right)$ In some embodiments, the probe time of arrival (ToA) for any acquisition hop can be determined based on the framework shown in FIG. 3A, and corresponds to the first arrival of significant signal energy. As shown therein, the ToA of any significant signal energy is denoted $t_0$, and more specifically, $t_{0,i}$ for the i-th acquisition hop. It is noted that determining the ToA requires using a reference signal to mitigate any response to interference, that the probe time of arrival must be less than a duration of a detection search window $T_0$, and that for a pure line-of-sight (LoS) link, $t_0$ is equal to the propagation distance. Accordingly, the time of arrival (ToA) is defined as the first time the correlation score exceeds a threshold (between 0 and 1), and can be expressed as:

$$t_{0,i} = \min\{t \in [0, T_0]: \rho_i(t) > \rho_*\}.$$

In some embodiments, the detection search window $T_0$ has a duration of 400 μsec (and corresponding to 120 km), and the probe time of arrival can be up to 400 μsec.

Figures 3A, 3B:
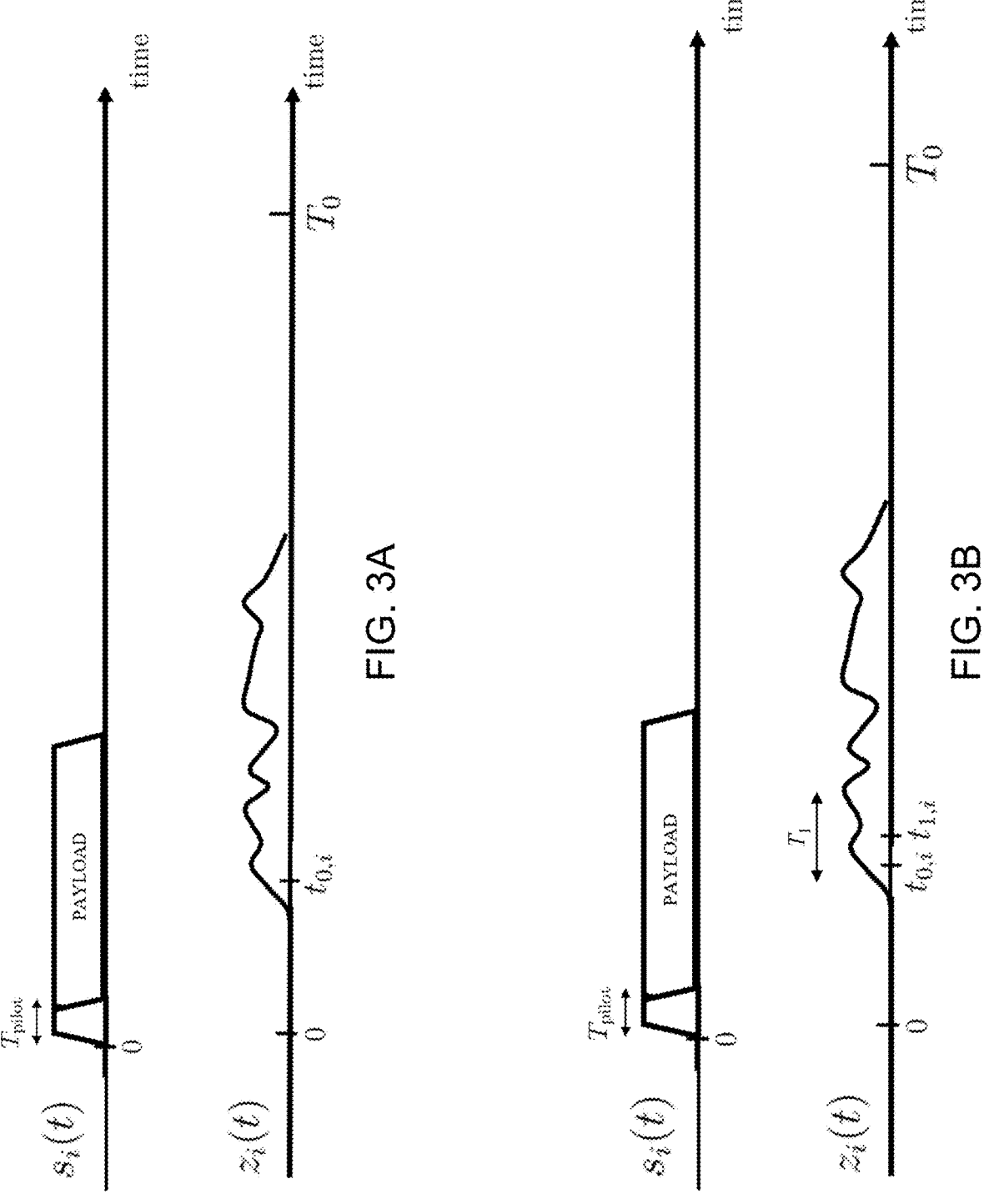
FIGS. 3A and 3B show the time of arrival (ToA) detection and fine-timing operation for the time-series on the i-th acquisition hop shown in FIG. 2, respectively.

In some embodiments, for the i-th acquisition hop, having determined the probe time of arrival $t_{0,i}$, the timing acquisition operation performs a fine-timing operation, which performs a second search to maximize, within a hypothesized maximum delay spread and around the probe ToA, the estimated collectible channel energy to generate a fine-timing $t_{1,1}$. As shown in FIG. 3B, the fine-timing $t_{1,i}$ is determined within a fine-timing search window $T_1$, which can be up to a maximum targeted channel delay spread $\tau_{max}$. The determination of the fine-timing can be expressed as:

$$t_{1,i} = \operatorname{argmax}_{t \in [t_{0,i}, t_{0,i}+T_1]} \int_{t-\tau_{max}/2}^{t+\tau_{max}/2} \lambda_i(v)dv.$$

In some embodiments, the maximum targeted channel delay spread $\tau_{max}$ can be between 0.1 μsec and 10 μsec. It is also noted that for a non-hopping system, the fine-timing $t_1$ is the point in time when the sequence is subjected to further processing.

In some embodiments, the final timing ($t_f$) estimate is the earliest of the fine-timing estimates across the acquisition hops, and is determined as:

$$t_f = \min_i t_{1,i}.$$

In order to determine the final timing estimate, the channel energy per delay in subsequent acquisition hops is examined, and in particular, a figure-of-merit (FoM) for the final acquisition timing is computed as the relative channel energy captured in $[t_f, t_f+\tau_{max})$, and which is expressed as:

$$FoM_j = \left( \int_{t=t_f}^{t_f+\tau_{max}} \lambda_j^2(t)dt \right) \Big/ \left( \int_{t=0}^{T_o} \lambda_j^2(t)dt \right).$$

In the above equation, the first integral is associated with the noisy acquisition and the second integral corresponds to the noiseless tap energy estimate. Given the figure-of-merit for each of the j hops, the final FoM can be computed as:

$$FoM = \mathbb{E}_j[FoM_j].$$

Figures 4A, 4B:
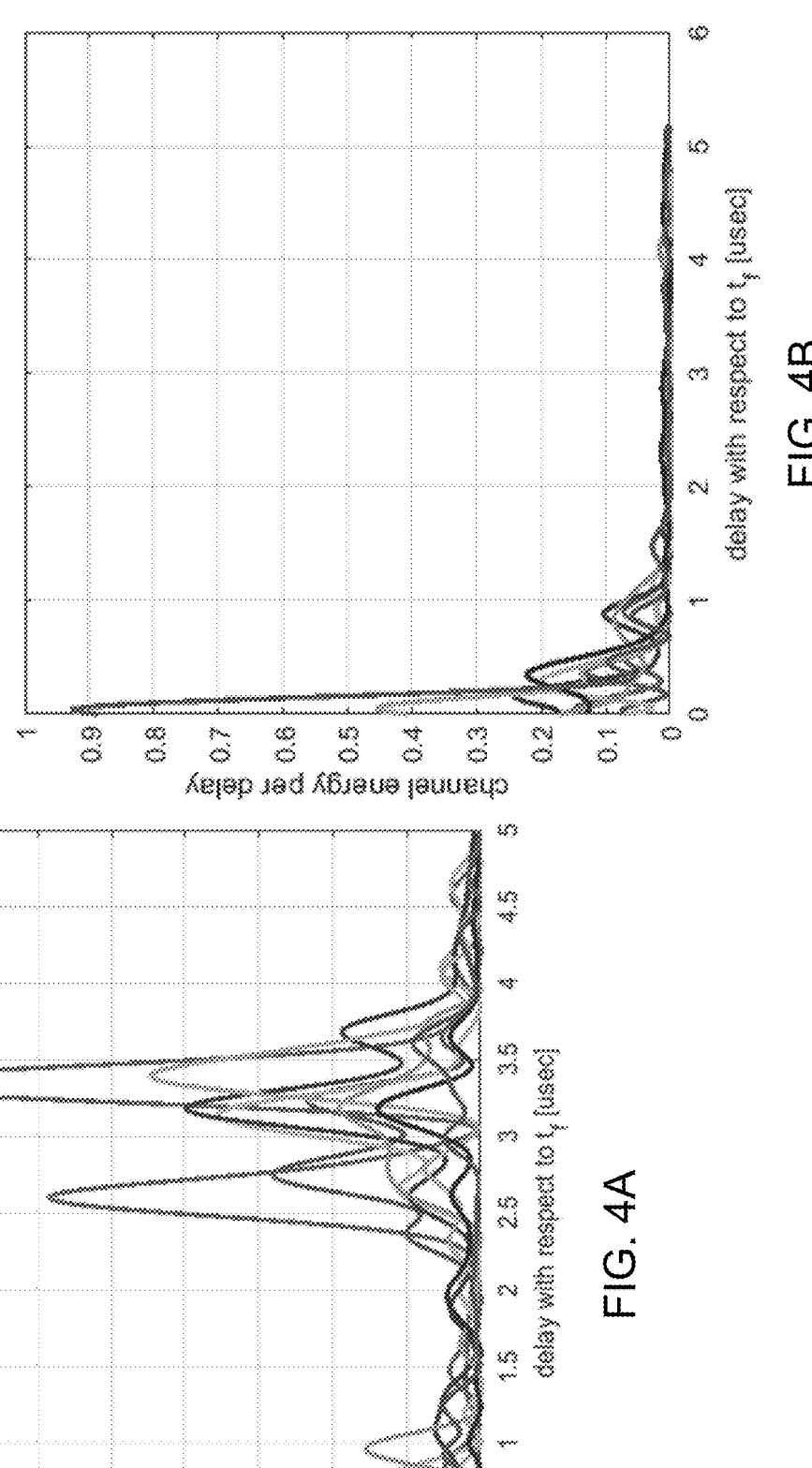
FIGS. 4A and 4B show examples of numerical plots of the channel energy per delay for randomly chosen non-acquisition hops for different final acquisition timing scenarios.

FIGS. 4A and 4B show examples of numerical plots of the channel energy per delay for randomly chosen non-acquisition hops. FIG. 4A represents several scenarios where the final timing of the non-acquisition hop captures the full energy of the channel profile, corresponding to a high FoM (0.998). In contrast, FIG. 4B represents scenarios where the final-timing captures only a trailing edge of the channel profile, corresponding to a low FoM (~0.3).

Figure 5:
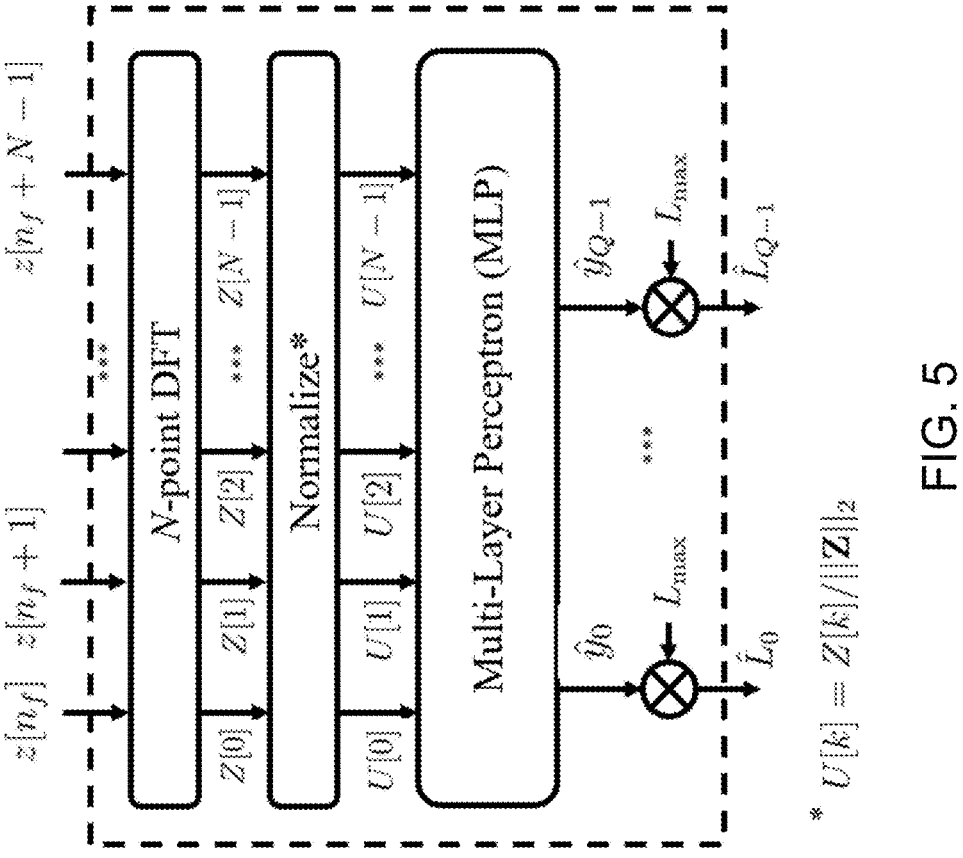
FIG. 5 shows an example architecture of a predominant delay estimator (PDE).

Embodiments of the disclosed technology advantageously provide a predominant delay estimator (PDE), which aims to use a snippet of a received hop to estimate predominant delays without pilot assistance (and only using chip timing from the acquisition hops). FIG. 5 shows an example architecture of a PDE, which is described using the following list of symbols (with their descriptions and representative values):

| Symbol | Description | Representative value |
|---|---|---|
| $n_f$ | Acquisition sample point | Integer |
| $z[n]$ | Chip-spaced samples | Complex (Re + jIm) values |
| $\tau_{max}$ | Max delay spread targeted | 5 usec |
| $\tau_0$ | Delay at which OCHIR has the largest energy | Real value in $[0, \tau_{max})$ |
| $L_{max}$ | Max delay spread targeted normalized to chip-duration | $30 = \tau_{max} \times R_{chip} =$ 5 usec × 6 Mcps |
| Q | Number of predominant delays targeted | Integer value, $Q \leq L_{max}$ |
| $L_q$ | qth predominant delay at which OCHIR has large energy (norm. to chip duration) | Real value in $[0, L_{max})$ |
| N | Observation length in chips | $N \geq L_{max}$ |
| $\hat{y}_q$ | qth MLP output, interpreted as the qth predominant chip-delay | Real value in $[0, 1)$ |

As shown in FIG. 5, N chip-spaced samples z[n] from after the acquisition sample point $n_f$ are input into an N-point Discrete Fourier Transform (DFT). The output of the N-point DFT is normalized, and serves as an input to a multi-layer perceptron, which outputs Q real-valued predominant chip-delay values $\hat{y}_q$ for q=1,2, . . . , Q. The q-th predominant chip-delay value $\hat{y}_q$ can be multiplied by the maximum delay spread targeted (normalized to chip duration) $L_{max}$ to yield the q-th predominant delay $L_q$ at which the Overall CHannel Impulse Response (OCHIR) has large energy (normalized to the chip duration).

Figure 6:
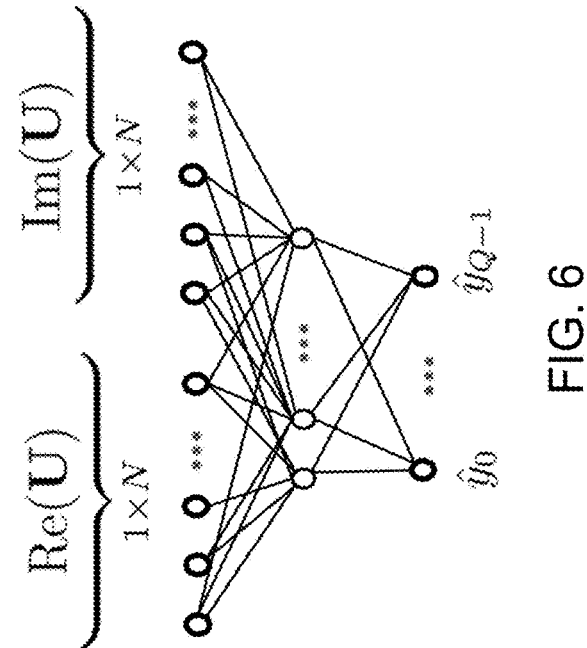
FIG. 6 shows an example configuration of a multi-layer perceptron used in the PDE.

FIG. 6 shows an example configuration of a multi-layer perceptron (MLP) used in a PDE, e.g., the PDE shown in FIG. 5. The configuration of the example MLP shown in FIG. 6 includes $\tau_{max}$=5 μsec, $R_{chip}$=6 Mcps, and N=32. As shown therein, the input to the MLP is of size 2N=64, and the MLP has a single hidden layer (e.g., $N_H$=4 nodes with hyperbolic tangent (tan h) activation) and an output layer (e.g., Q=1 node with sigmoid activation). In this example, the total number of weights (including bias) is $(2N+1+Q)$ $N_H$+Q=265.

Figure 7:
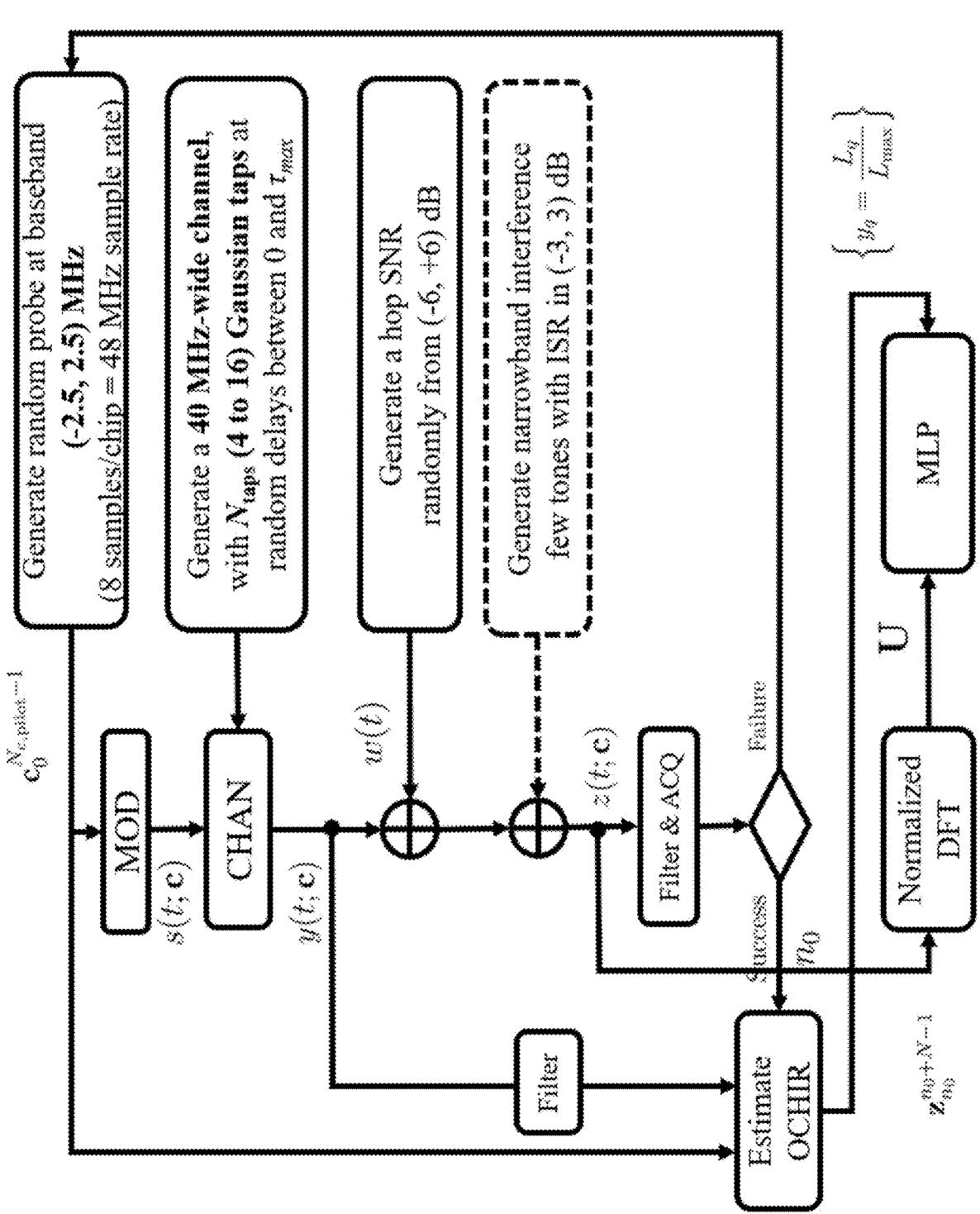
FIG. 7 shows an annotated flow diagram for an example PDE training procedure.
Figure 8:
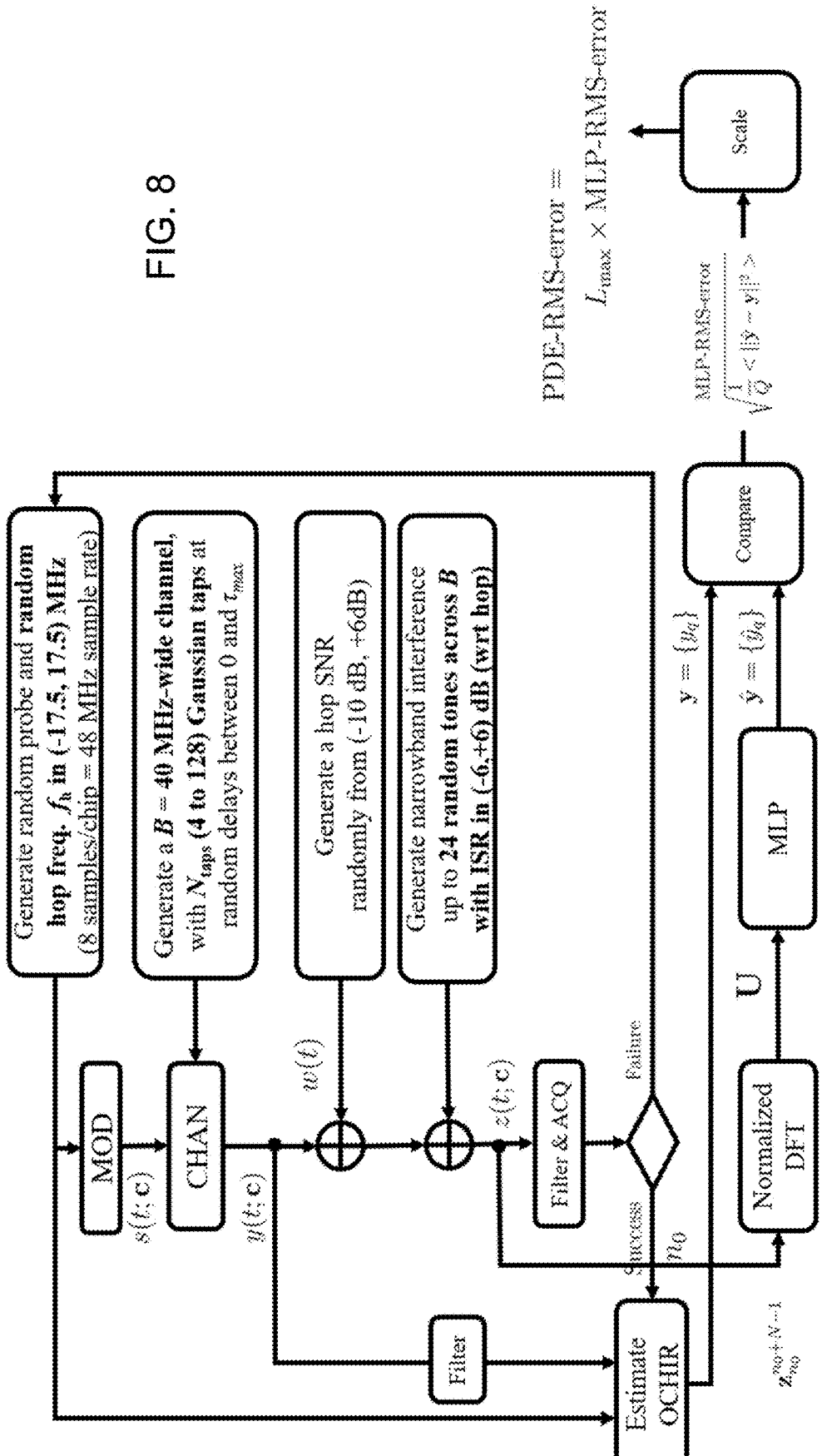
FIG. 8 shows an annotated flow diagram for an example PDE testing procedure.
Figure 9B:
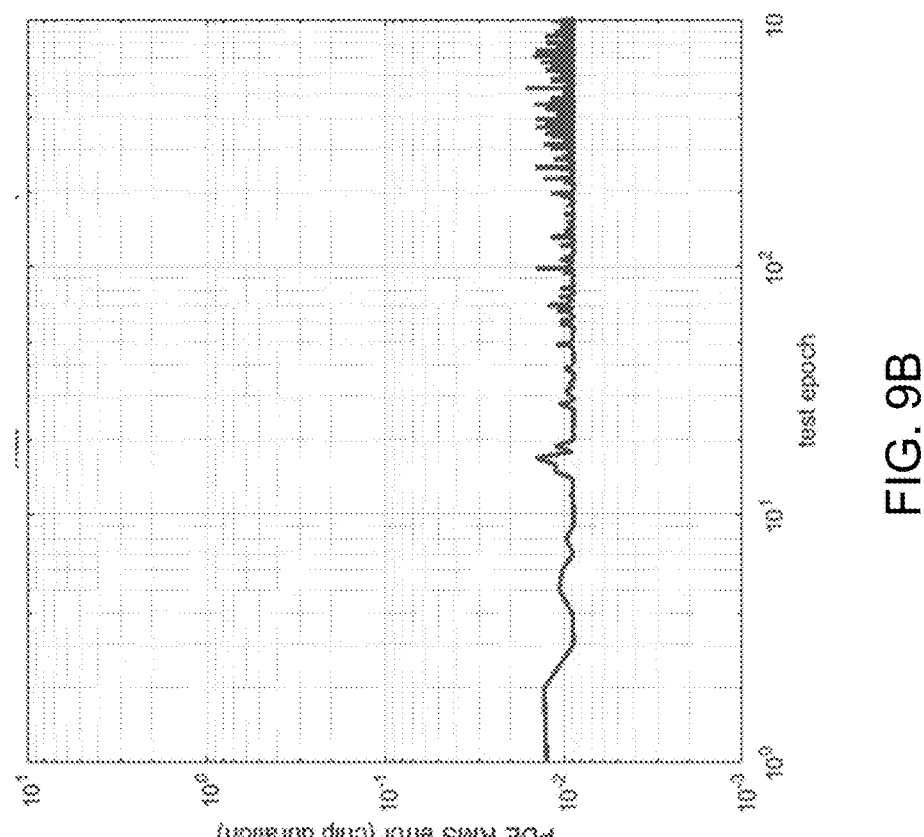
FIGS. 9A and 9B show numerical results for example training performance and testing performance for a PDE, respectively.
Figure 9A:
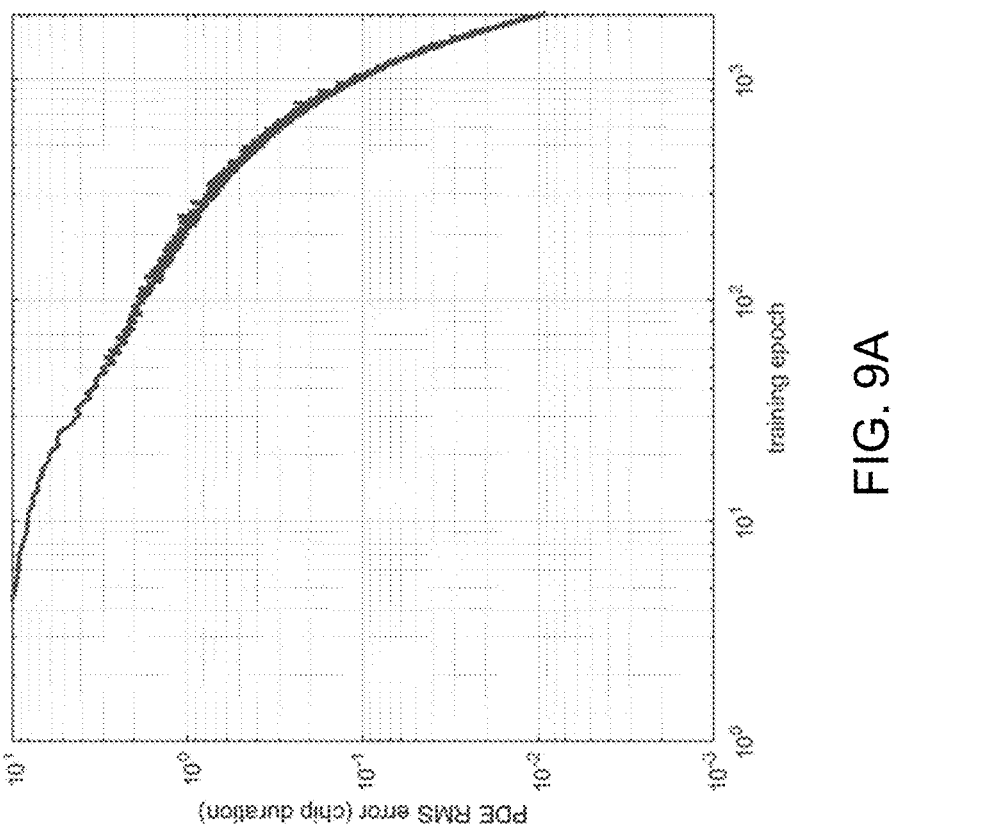

FIGS. 7 and 8 show annotated flow diagrams for an example training procedure and testing procedure for a PDE, respectively, and for which numerical results are plotted in FIGS. 9A and 9B, respectively. As shown in FIG. 7, training the PDE includes data generation (as annotated in the upper right therein), using the normalized DFT of chip-spaced samples as an input to the training, and with a target of the Q predominant delays as measured from the noiseless received data. For these numerical results, loss function used was the squared-error (which was L2-regularized with $\lambda$=10⁻⁶), learning rate was set to 0.005, Nesterov momentum with μ=0.5 was used, and the mini-batch was set to 64 examples. FIG. 9A shows the RMS error of the PDE as a function of training epoch, and as shown therein, the RMS error reduces to $10^{-2}$ when training the PDE. In the annotated flow diagram shown in FIG. 8, testing the PDE also includes data generation (also annotated in the upper right therein), and evaluating the efficacy of the PDE by comparing its performance to the estimated OCHIR for noiseless conditions. As shown in FIG. 9B, the PDE-RMS error is consistently around $10^{-2}$ for all the testing epochs. The numerical results in FIGS. 9A and 9B were obtained for $\tau_{max}$=5 μsec, N=32, $H_1$=4, and Q=1, i.e., the channel has exactly one predominant delay.

The computational complexity of the PDE can be compared to implementations that use the full correlative search using the number of real multiplication operations (or multiplies) per hop as the complexity measure (or metric). The $\tau_{max}$=5 μsec case is considered, and it is noted that complexity scales linearly with the maximum hypothesized delay spread.

In an example, the full correlative search uses 30 hypothesized chip delays, and is required to compute dot-products for each delay, e.g., $N_c$=600 complex dot products would need 1800 real multiplies. The analysis for this case results in the full correlative search needing more than 50,000 operations. In comparison, the PDE is required to perform the computations required for both feature extraction and inference. For the feature extraction, the 2N-FFT needs 3×64×log₂64=1152 real multiplies and the normalization needs 2N=64 real multiplies. In practice, the real multiplies for normalization can be based on simple MSB information. For the inference, 265 real multiplies are needed. And completing the analysis in this case results in the PDE needing around the order of 1500 operations, which is nearly two orders of magnitude lower than the real multiplication operations needed by the full correlative search.

FIG. 10 shows a flowchart of an example method for wireless communication. The method 1000 includes, at operation 1010, receive, over a channel, an FH DSSS signal comprising a pilot sequence and an information signal, and associated with multiple frequency hops. In some embodiments, the FH DSSS signal corresponds to a plurality of chip-spaced samples, and which are associated with the multiple frequency hops.

The method 1000 includes, at operation 1020, perform, using a first subset of the multiple frequency hops, a timing acquisition operation using the pilot sequence. In some embodiments, the timing acquisition operation is performed using a full correlative processing operation, e.g., using 30 hypothesized chip delays. In some embodiments, using the first subset of frequency hops completely determines an output of the timing acquisition operation.

The method 1000 includes, at operation 1030, perform, subsequent to the timing acquisition operation and using a second subset of the multiple frequency hops, a predominant delay estimation (PDE) operation (e.g., using the example PDE architecture shown in FIG. 5). In some embodiments, the second subset of the multiple frequency hops is non-overlapping with (or different from) the first subset of the multiple frequency hops. In some embodiments, the PDE operation includes computing an output of a discrete Fourier transform of a subset of the plurality of chip-spaced samples, which are associated with the second subset of frequency hops. In other embodiments, estimating predominant channel delays excludes using the full correlative processing operation. In some embodiments, and similar to the first subset of frequency hops being sufficient for determining the output of the timing acquisition operation, using the second subset of frequency hops completely determines an output of the predominant delay estimation operation.

The method 1000 includes, at operation 1040, compute, based on an output of the predominant delay estimation operation, a channel estimate. In some embodiments, the channel estimate includes an estimate of each of a number of channel taps that represent the channel, with the estimate of each channel tap including a gain, a phase, and a delay.

The method 1000 includes, at operation 1050, perform, based on the channel estimate, a receiver processing operation on the FH DSSS signal to generate an estimate of the information signal.

In some embodiments, performing the PDE operation (e.g., as part of operation 1030) comprises using a multilayer perceptron (MLP). In some examples, the method 1000 further includes the operations of configuring a single hidden layer of the MLP to use a hyperbolic tangent activation, configuring an output layer of the MLP to use a sigmoid activation, and deriving one or more hyperparameters of the MLP based on minimizing a squared-error loss function (e.g., as described in the context of FIG. 6).

In some embodiments, the MLP is trained on short snippets of the output of the discrete Fourier transform with labels indicating predominant delays normalized by a maximum hypothesized delay spread.

In some embodiments, a number of frequency hops in the first subset of frequency hops is less than a fixed percentage of the number of frequency hops in the plurality of frequency hops. In some examples, the fixed percentage is one of 10%, 5%, 1%, or 0.05%.

In some embodiments, the channel is characterized by a number of channel taps, the channel estimate comprises an estimate of each of the number of channel taps, computing the channel estimate uses the pilot sequence, and the receiver processing operation comprises a demodulation operation using a RAKE receiver that is based on the estimate of each of the number of channel taps. In some examples, the receiver processing operation comprises a decoding operation that uses a forward error correction (FEC) decoder. In other examples, the receiver processing operation comprises a localization operation.

In some embodiments, performing the timing acquisition operation (e.g., as part of operation 1020) includes (a) performing a correlation between a subset of the plurality of chip-spaced samples and the pilot sequence to generate an estimate of a time of arrival (ToA) of the FH DSSS signal (e.g., as shown in FIG. 3A) with the subset of the plurality of chip-spaced samples being associated with the first subset of frequency hops, (b) performing, for each of the first subset of frequency hops, a fine-timing operation within a search window to generate a fine-timing estimate (e.g., as shown in FIG. 3B) with the search window being defined based on a maximum delay spread of the channel and the estimate of the ToA, and (c) generating a final timing estimate based on the fine-timing estimate for each of the first subset of frequency hops (e.g., using the minimum operator as described earlier in this patent document).

Figure 11:
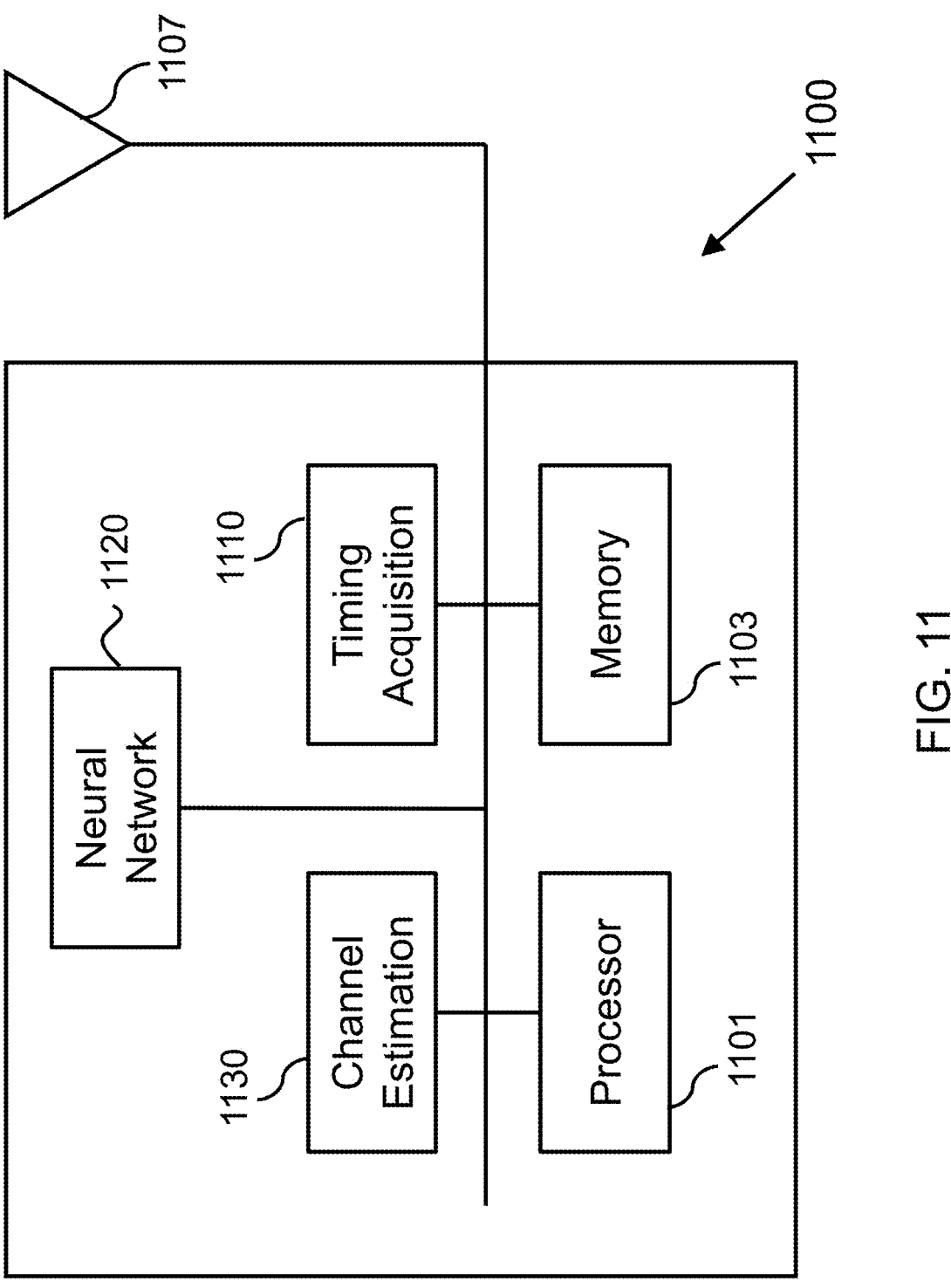
FIG. 11 is a block diagram representation of a portion of an apparatus that may implement a method or technique described in this patent document.

FIG. 11 is a block diagram representation of a portion of an apparatus, in accordance with some embodiments of the presently disclosed technology. An apparatus 1100 can include at least one processor 1101 (e.g., a microprocessor) that implements one or more of the techniques presented in this document. Apparatus 1100 can optionally include one or more memories 1103 configured to store information such as data and/or instructions. The apparatus 1100 can further include a timing acquisition module 1110, a channel estimation module 1120, and a neural network 1130, each of which are communicatively coupled to the at least one processor 1101 and the memory 1103. In some embodiments, the apparatus 1100 may be further configured to send and/or receive wireless signals over one or more communication interfaces such as antenna 1107. In some embodiments, one or more of the timing acquisition module 1110, the channel estimation module 1120, and the neural network 1130 may be implemented in the processor 1101. In other embodiments, the neural network 1130 may be implemented within the channel estimation module 1120. At least some of the disclosed techniques, modules or functions are implemented using the apparatus 1100. For example, the apparatus 1100 may be used to implement wireless device or communication nodes, also called nodes, described herein.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of wireless communication, comprising:

receiving, over a channel, a plurality of chip-spaced samples corresponding to a frequency-hopping (FH) direct-sequence spread spectrum (DSSS) signal, wherein the FH DSSS signal comprises a pilot sequence and an information signal, and wherein the plurality of chip-spaced samples is associated with a plurality of frequency hops;

performing, using a first subset of frequency hops of the plurality of frequency hops, a timing acquisition operation using the pilot sequence, wherein using the first subset of frequency hops determines an output of the timing acquisition operation;

performing, subsequent to the timing acquisition operation and using a second subset of frequency hops of the plurality of frequency hops, a predominant delay estimation operation comprising computing an output of a discrete Fourier transform of a subset of the plurality of chip-spaced samples, wherein the second subset of frequency hops is non-overlapping with the first subset of frequency hops, wherein using the second subset of frequency hops determines an output of the predominant delay estimation operation, and wherein the subset of the plurality of chip-spaced samples is associated with the second subset of frequency hops;

computing, based on the predominant delay estimation operation and the pilot sequence, a channel estimate; and performing, based on the channel estimate, a receiver processing operation on the FH DSSS signal to generate an estimate of the information signal.

2. The method of claim 1, wherein performing the predominant delay estimation operation comprises using a multilayer perceptron (MLP).

3. The method of claim 2, further comprising:

configuring a single hidden layer of the MLP to use a hyperbolic tangent activation;

configuring an output layer of the MLP to use a sigmoid activation; and deriving one or more hyperparameters of the MLP based on minimizing a squared-error loss function.

4. The method of claim 1, wherein a number of frequency hops in the first subset of frequency hops is less than a fixed percentage of the number of frequency hops in the plurality of frequency hops.

5. The method of claim 4, wherein the fixed percentage is one of 10%, 5%, 1%, or 0.05%.

6. The method of claim 1, wherein the channel is characterized by a number of channel taps, and wherein the channel estimate comprises an estimate of each of the number of channel taps.

7. The method of claim 6, wherein computing the channel estimate uses the pilot sequence, and wherein the receiver processing operation comprises a demodulation operation using a RAKE receiver that is based on the estimate of each of the number of channel taps.

8. The method of claim 7, wherein the receiver processing operation comprises a decoding operation that uses a forward error correction (FEC) decoder.

9. The method of claim 7, wherein the receiver processing operation comprises a localization operation.

10. The method of claim 1, wherein performing the timing acquisition operation comprises:

performing a correlation between a subset of the plurality of chip-spaced samples and the pilot sequence to generate an estimate of a time of arrival (ToA) of the FH DSSS signal, wherein the subset of the plurality of chip-spaced samples is associated with the first subset of frequency hops;

performing, for each of the first subset of frequency hops, a fine-timing operation within a search window to generate a fine-timing estimate, wherein the search window is defined based on a maximum delay spread of the channel and the estimate of the ToA; and generating a final timing estimate based on the fine-timing estimate for each of the first subset of frequency hops.

11. A system for wireless communication, comprising:

one or more processors and a memory including instructions stored thereupon, wherein the instructions upon execution by the one or more processors cause the system to:

receive, over a channel, a frequency-hopping (FH) direct-sequence spread spectrum (DSSS) signal comprising a pilot sequence and an information signal, wherein the FH DSSS signal is associated with a plurality of frequency hops;

perform, using a first subset of frequency hops of the plurality of frequency hops, a timing acquisition operation using the pilot sequence, wherein using the first subset of frequency hops determines an output of the timing acquisition operation;

perform, subsequent to the timing acquisition operation and using a second subset of frequency hops of the plurality of frequency hops, a predominant delay estimation operation, wherein the second subset of frequency hops is non-overlapping with the first subset of frequency hops, and wherein using the second subset of frequency hops determines an output of the predominant delay estimation operation;

compute, based on an output of the predominant delay estimation operation, a channel estimate using a multilayer perceptron (MLP); and perform, based on the channel estimate, a receiver processing operation on the FH DSSS signal to generate an estimate of the information signal.

12. The system of claim 11, wherein the output is based on an output of a discrete Fourier transform of a plurality of chip-spaced samples associated with the second subset of frequency hops.

13. The system of claim 12, wherein the MLP is trained on short snippets of the output of the discrete Fourier transform with labels indicating predominant delays normalized by a maximum hypothesized delay spread.

14. The system of claim 13, wherein the MLP comprises (a) a single hidden layer that uses a hyperbolic tangent activation and (b) an output layer that uses a sigmoid activation, and wherein one or more hyperparameters of the MLP are derived based on minimizing a squared-error loss function.

15. A system for wireless communication, comprising:

a transceiver configured to receive, over a channel, a frequency-hopping (FH) direct-sequence spread spectrum (DSSS) signal comprising a pilot sequence and an information signal, wherein the FH DSSS signal is associated with a plurality of frequency hops; and one or more processors, communicatively coupled to the transceiver, configured to cause the system to:

perform, using the pilot sequence and a first subset of the plurality of frequency hops, a timing acquisition operation using a full correlative processing operation, wherein using the first subset of the plurality of frequency hops determines an output of the timing acquisition operation, perform, subsequent to the timing acquisition operation and using a second subset of the plurality of frequency hops, a predominant delay estimation operation, wherein estimating predominant channel delays excludes using the full correlative processing operation, wherein the second subset of the plurality of frequency hops is non-overlapping with the first subset of the plurality of frequency hops, and wherein using the second subset of the plurality of frequency hops determines an output of the predominant delay estimation operation, compute, based on an output of the predominant delay estimation operation, a channel estimate comprising an estimate of each of a number of channel taps that represent the channel, wherein the estimate of each channel tap comprises a gain, a phase, and a delay, and perform, based on the channel estimate, a receiver processing operation on the FH DSSS signal to generate an estimate of the information signal.

16. The system of claim 15, wherein performing the predominant delay estimation operation comprises using a multilayer perceptron (MLP) comprising (a) a single hidden layer configured to use a hyperbolic tangent activation, (b) an output layer configured to use a sigmoid activation, and (c) one or more hyperparameters derived based on minimizing a squared-error loss function.

17. The system of claim 16, wherein an input to the MLP comprises an output of a discrete Fourier transform of a plurality of chip-spaced samples associated with the second subset of the plurality of frequency hops.

18. The system of claim 15, wherein the full correlative processing operation comprises performing a correlation between the pilot sequence and each of the first subset of the plurality of frequency hops for each hypothesized chip delay.

19. The system of claim 15, wherein the receiver processing operation comprises a decoding operation or a localization operation.

20. The system of claim 15, wherein performing the timing acquisition operation comprises:

performing, for each of the first subset of the plurality of frequency hops, a fine-timing operation within a search window to generate a fine-timing estimate; and generating a final timing estimate based on the fine-timing estimate for each of the first subset of the plurality of frequency hops.

* * * * *